Sept. 14, 1965                      I. STOLLMAN                      3,205,976
                              CHECK-OUT CART AND COUNTER
Filed July 28, 1961                                              3 Sheets-Sheet 1
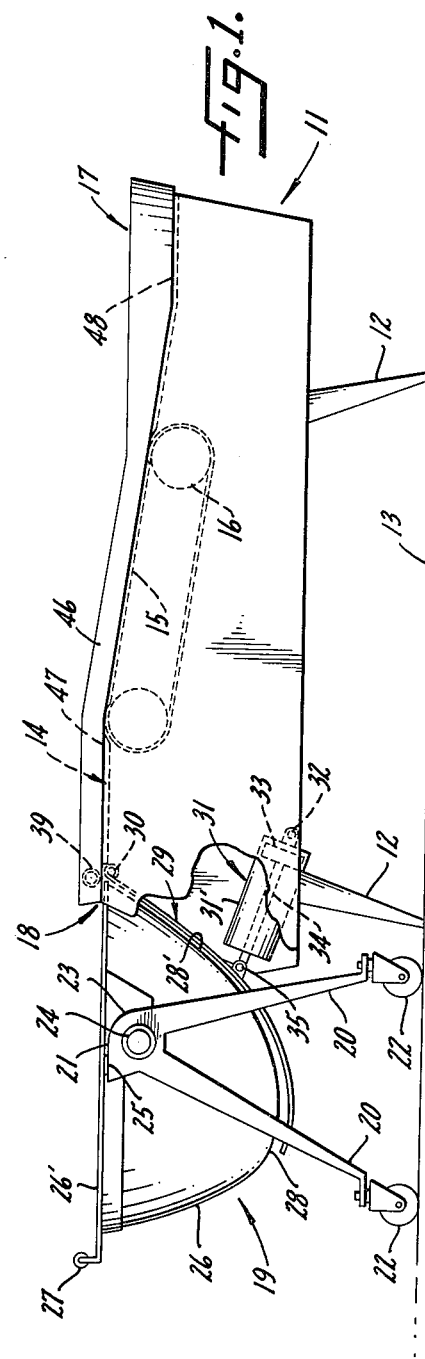
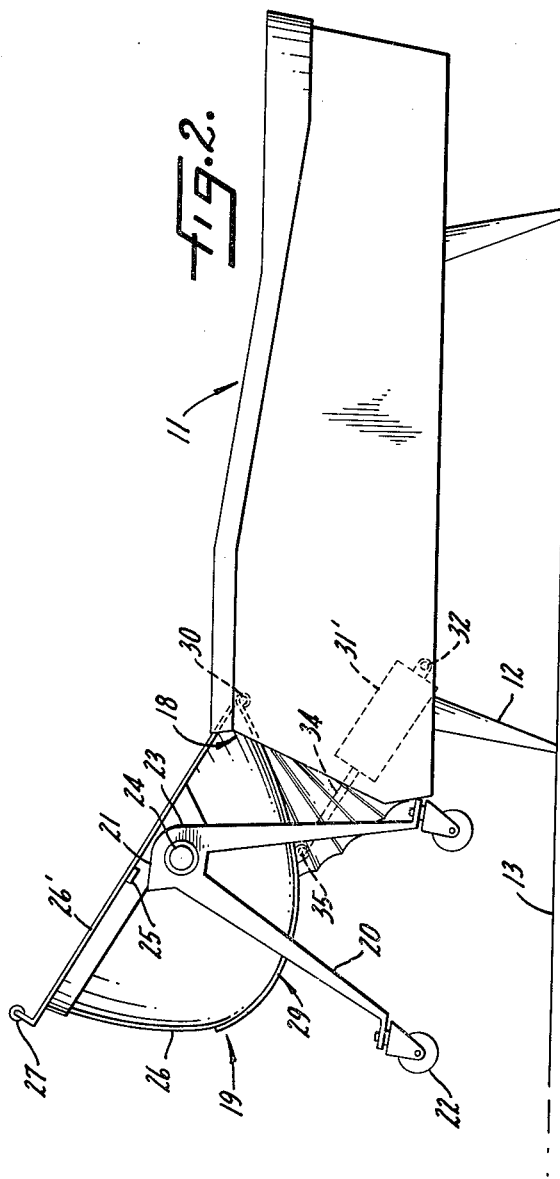
INVENTOR.
Irving Stollman,
BY
Lockwood, Woodard, Smith & Weikart
Attorneys.

Sept. 14, 1965     I. STOLLMAN     3,205,976
CHECK-OUT CART AND COUNTER
Filed July 28, 1961     3 Sheets-Sheet 2
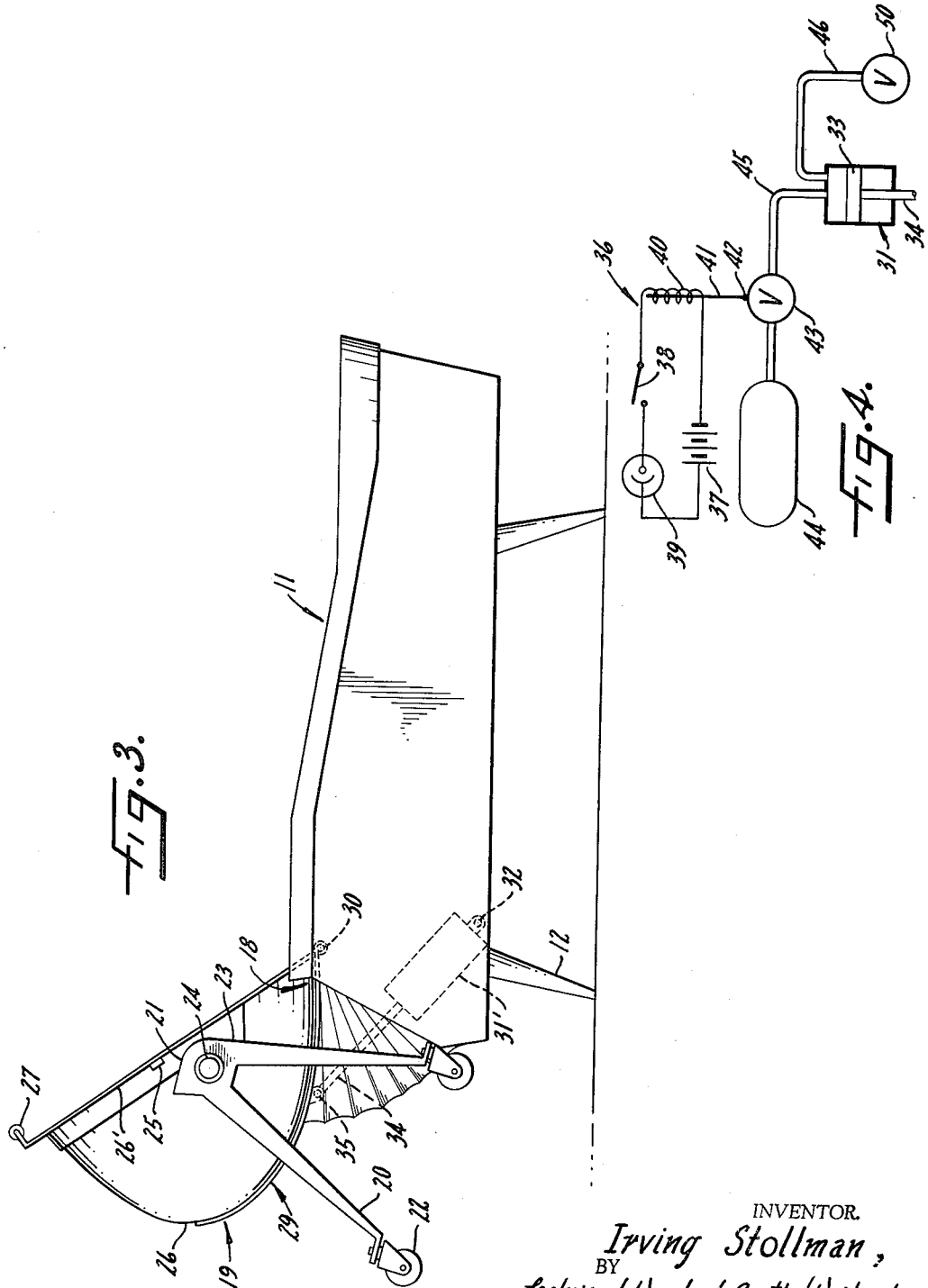
INVENTOR.
*Irving Stollman*,
BY
*Lockwood, Woodard, Smith & Weikart*
Attorneys.

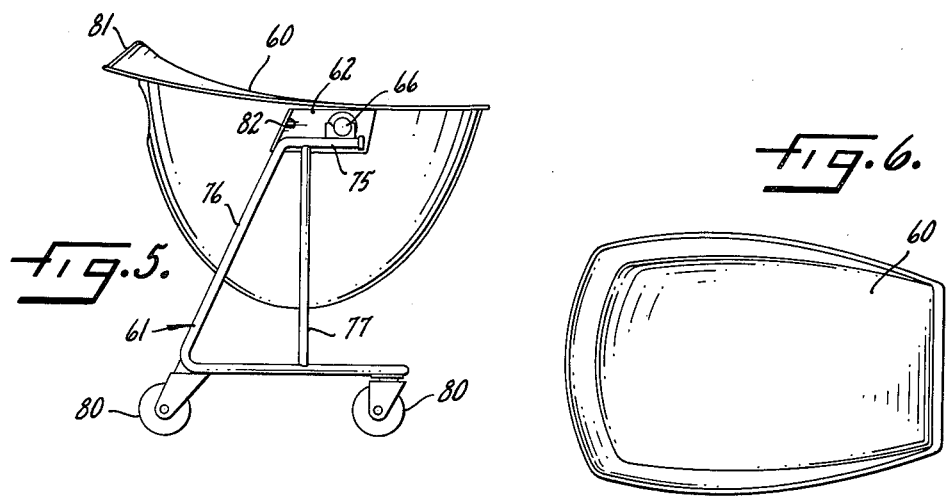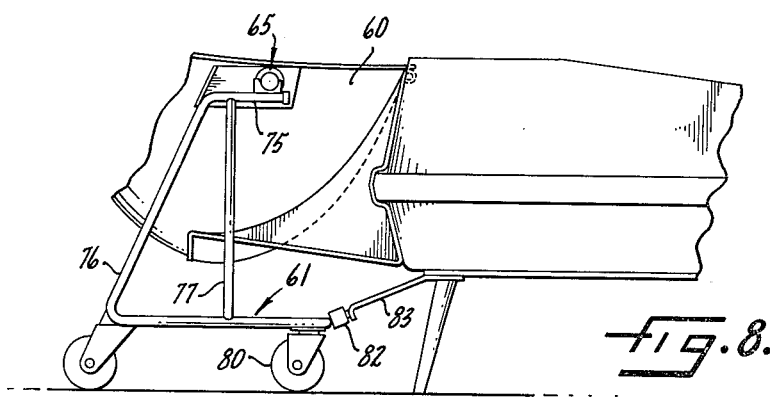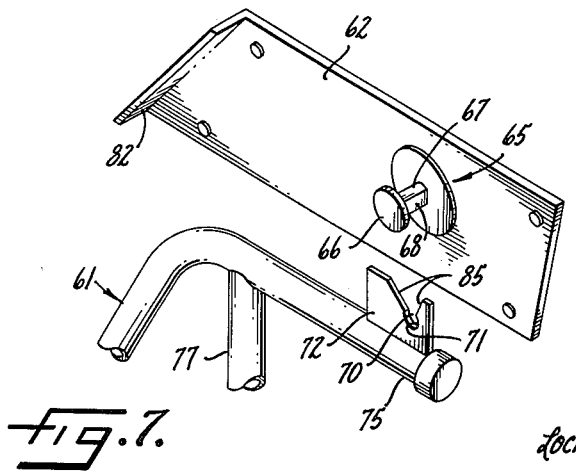

United States Patent Office 3,205,976
Patented Sept. 14, 1965

3,205,976
CHECK-OUT CART AND COUNTER
Irving Stollman, 18440 Greenfield, Detroit, Mich.
Filed July 28, 1961, Ser. No. 127,568
6 Claims. (Cl. 186—1)

This invention relates to carts and counters such as those used for checking out groceries in grocery stores, and to a cart-counter arrangement incorporating means for unloading the contents of the cart onto the counter.

Heretofore, various difficulties have been encountered in supermarkets and the like in transferring the goods from the grocery cart to the counter. This operation is either performed by the customer or by the store employee. In either case, considerable effort is involved in manually handling each of the items in the grocery cart. In the case of the employee, considerable fatigue may result from constant unloading of carts and reaching for the items therein. Consequently, a primary object of the present invention is to provide an automatic cart unloader which will greatly facilitate the transferring of the items from the cart to the check-out counter.

A further object of the invention is to provide a novel form of check-out cart particularly adapted for cooperative coaction with a power operated unloading means.

Another object of the invention is to provide an improved cart and counter arrangement.

A further object of the invention is to provide an improved check-out cart and counter arrangement incorporating a novel power operated mechanism, circuit and control arrangement for unloading the contents of the cart upon the counter.

Related objects and advantages will become apparent as the description proceeds.

In accordance with the present invention, one embodiment thereof might include power means for elevating the check-out cart off the floor in such a fashion that the basket is tilted toward the counter top whereby the contents slidably shift without tumbling to the front of the basket permitting easy manual transfer of the articles from the cart to the counter top. There may also be provided a switch operated by engagement of the cart with the check stand, said switch energizing a circuit which initiates operation of the power means. The circuit may include an electric eye positioned to sense the position of the contents of the basket and to stop operation of the power means as long as objects are positioned in the front of the basket and adjacent the counter top.

The full nature of the invention will be understood from the accompanying drawings and the following description and claims:

FIG. 1 is a diagrammatic side elevational view of a check-out counter and grocery cart embodying the present invention.

FIG. 2 is a similar view illustrating an intermediate unloading position of the check-out cart.

FIG. 3 is a similar view illustrating the final unloading position of the check-out cart.

FIG. 4 is a schematic wiring diagram showing the relationship of a control circuit, a power source and a power operated lift forming a part of the structure of FIG. 1.

FIG. 5 is a side elevation of an alternative form of grocery cart for use in the present invention.

FIG. 6 is a top plan view of the basket of the cart of FIG. 5.

FIG. 7 is a perspective fragmentary detail view of the pivotal mounting arrangement of the basket upon the cart frame.

FIG. 8 is a fragmentary view of a portion of a check-out counter and a portion of the cart of FIGS. 5–7 and showing means for retaining the cart in position for unloading.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, FIGS. 1, 2 and 3 show a conventional grocery check-out counter 11, including a base with mounting supports such as the legs 12, engaging the store floor 13. The counter top is generally indicated at 14 at one end thereof, including the conveyor belt 15 in registry with the top surface of the counter belt for transporting goods from counter top portion 14 to the packaging end of the counter as indicated at 17, said conveyor having a suitable power operated drive means 16. The counter includes a transverse end wall structure 18 at its left end against which the grocery check-out cart 19 is movably projected to initiate the operation as hereafter described.

The base frame of the grocery cart is made of a suitable light material such as cast aluminum and includes the laterally opposed leg structures 20 on opposite sides of the cart assembly terminating at their lower ends in the swivel mounted casters 22. In the present embodiment of the invention, the legs diverge downwardly as shown in FIG. 1, and at their respective upper ends terminate in supports 23, including the horizontally disposed top surfaces 21.

The cart basket 26 is formed of a suitable light material. In the illustrated embodiments of the invention, a plastic material such as polyethylene or the like is employed for the basket and is formed to the upwardly opening, smoothly curved, scoop-shape shown.

The upper open margin of the basket 26 terminates in a peripheral outwardly extending flange 26' to which is attached a transverse pushing handle 27. The basket 26 is received between the upright pairs of legs 20 and forwardly of its central portion is pivotally mounted at 24 by suitable trunnion mechanism to the supports 23 forming a part of the base frame of the cart. Cushion stops 25 made of rubber or the like are secured to the undersurface of the continuous flange 26' upon opposite sides of the cart rearwardly of the pivotal mounting 24, so as to cooperatively and supportably engage the top edge 21 of the respective supports 23 for normally maintaining the basket 26 in the use position shown in FIG. 1. The pivotal mounting of the basket within the cart makes possible tilting of the basket with respect to the frame of the cart as indicated in FIGS. 2 and 3.

After filling of the cart with groceries, the cart 19 is moved over the floor 13 into registry with the corresponding end wall structure of the check-out counter as shown in FIG. 1. In the position of FIG. 1, the cart is located directly over a grocery cart lift 29 mounted on the counter 11. The lift 29 is in the form of an elongated body of generally rectangular shape which is pivotally mounted at its upper end to a portion of the check-out counter as at 30 and is smoothly curved downwardly and outwardly as shown for cooperative engagement with the bottom surface portion 28 and the forwardly and upwardly inclined surface 28' of the cart basket. Accordingly, there is a snug nesting relationship between the check-out cart and lift when the same is raised as hereafter described.

Various types of power operable means could be employed for raising the lift such as a bellows operated by compressed air or some other reciprocal means. The present preferred embodiment employs a pneumatic cylinder arrangement 31 whose lower end is pivoted at 32 to a portion of the check-out counter inwardly of the end wall structure. The cylinder arrangement includes a reciprocal piston 33 terminating in the elongated piston rod 34 which projects from the cylinder 31' outwardly thereof, and is pivotally joined or connected at 35 to an undersurface portion of the lift 29 intermediate its ends. It can be seen that operation of the cylinder 31 under the control of a source of compressed air will cause outward movement of piston 33 and corresponding pivotal movements of lift 29 through the stages shown in FIGS. 1, 2, and 3.

In FIG. 4, there is shown in schematic form an electric control generally indicated at 36 defining a circuit which includes a power source 37, a manually operated, normally open switch 38, an electric eye 39 and a solenoid 40, all of which are in series. The solenoid operates a movable armature 41 connected at 42 to the valve 43 controlling conduit 45 which connects a compressed air tank 44 with cylinder arrangement 31. Energization of the solenoid energizes the valve, opening it to deliver compressed air through conduit 45 to the cylinder 31 for activating piston 33 and piston rod 34 to swing the lift 29 upwardly about the pivot point 30. The switch 38 may be mounted behind the counter for manual energization by the store employee or may be mounted, for example, on the lift so that it is automatically energized by moving the cart against the lift.

The counter top 14 is provided with upwardly projecting retainer elements 46 extending along the border of the counter top except at the portion thereof adjacent the lift 29. The electric eye 39 is mounted on one side of the retainer elements 46 to receive light from a suitable light source positioned directly oppositely of the electric eye and mounted on the opposite retainer element 46. Whenever objects move between the light source and the electric eye, the electric eye prevents flow of current through the circuit 36 assuming, of course, that the switch 38 is closed.

In operation, when the cart 19 is positioned as shown in FIG. 1, the switch 38 is closed either manually or automatically by engagement of the cart therewith. Thus, the control of the circuit 36 is thereby placed under the electric eye 39. Since there are no objects interrupting the light beam of the electric eye, the solenoid 40 is energized moving the armature 41 to open the valve 43 to permit flow of compressed air from the compressed air tank 44 through conduit 45 and into the cylinder arrangement 31. It should be mentioned that whenever the solenoid 40 is deenergized, a suitable spring returns the armature to a position wherein the valve 43 is closed.

The compressed air flowing into the cylinder arrangement 31 causes the piston 33 and piston rod 34 to move outwardly of the cylinder 31' and also causes the lift 29 to engage the undersurface of the cart basket. The valve, tank and cylinder assembly should be so arranged that pivoting of the lift occurs at a speed which is not excessively great or excessively slow. As long as there is no interruption of the light beam for the electric eye, the compressed air valve 43 remains open and the lift 29 moves through the positions shown in FIGS. 2 and 3.

As the position and attitude of the basket change, the food articles therein will shift to the front of the basket so as to be within easy reach of the clerk at the counter and so as to be on a level generally the same as the counter top. As the basket moves upwardly through the various positions illustrated, and depending upon the amount of groceries within the cart, certain of the groceries will slide to a position wherein the beam of the electric eye is interrupted. As a result, the solenoid 40 is deenergized and the valve 43 closes locking the lift at the position reached by means of the compressed air already received within the cylinder 31'. This stopping or locking of the basket in a particular pivoted position will also occur whenever the clerk leaves an object directly in the path of the electric eye beam.

Of course, as the grocery basket is emptied, the electric eye beam will be unblocked and further upward pivoting of the grocery cart will occur until the final position illustrated in FIG. 3 is reached. It should be mentioned that the smoothly curving, concave, scoop-shape of the basket makes possible a smooth sliding of the objects forwardly and toward the counter top.

As the clerk removes the articles from the basket, they are individually checked across a conventional dead plate portion 47 of the counter top and are placed on the conveyor belt 15 which moves each item rapidly away from the checking area to the packing deck 48, also forming a part of the counter top. In the present embodiment of the present invention, the upward limit of travel of the basket is reached when the piston 33 has completed its stroke within the cylinder. After the clerk has removed all the objects from the basket, a valve 50 in back of the counter is operated to release the compressed air from the cylinder arrangement and to permit the lift and basket to move downwardly returning to the position of FIG. 1. The cart is then removed from the lift and placed in the aisle for use by the next customer.

Depending upon the location and operation of the switch 38, movement of the cart away from the lift 29 will open the switch 38 deenergizing the electric circuit. The apparatus is then in readiness for a further unloading cycle. Preferably the valve 50 would be of the push button variety so that release of the push button thereof again closes the valve by suitable spring means.

Referring now to FIGS. 5–8, there is illustrated an alternative form of grocery cart for use in the present invention. The primary distinction between the alternative embodiment and the above described embodiment is the fact that the basket 60 is detachable from the grocery cart frame 61 whereas the above described embodiment included a basket which was retained in pivotal association with the grocery cart frame. It can be seen from FIGS. 5 and 6 that the basket 60 has a smoothly curving, upwardly opening, scoop-shape which permits smooth sliding of the objects in the basket forwardly during unloading.

Referring particularly to FIG. 7, there is illustrated a representative one of a pair of brackets 62, each of which is attached to an opposite side of the basket. Extending outwardly from the bracket 62 is a trunnion element 65 which includes an enlarged head 66 and a cylindrical portion 67 having shaved side portions 68. When the basket is in the position of FIG. 5, the lift of the counter may raise the basket upwardly to detach it from the frame 61 because the shaved side portion 68 permits movement of the trunnion element through the neck 70 of an opening 71 in bracket 72 attached to the upper end 75 of the frame 61. It will be clear that a bracket 72 is provided at the opposite sides of the frame 61.

The frame of the cart further includes a single piece of tubing 76 which terminates at its opposite ends in the two upward portions 75, each of which mounts a bracket 72. Also provided, is a pair of vertical supports 77 fixed to and reinforcing the tubing 76. Casters 80 are swiveled to the tubular element 76 at the lower portions thereof. The basket 60 also includes a handle portion 81 which may be used to push the basket or to tip it if manual unloading of the basket is desired.

It should be noted that the point of pivotal mounting or, in other words, the trunnion elements 65 are located forwardly of the center of gravity of the basket and, therefore, the rearward portion of the basket tends to retain its downward position as illustrated in FIG. 5. In such downward position, the outwardly extending flange 82 of the bracket 62 rests upon the frame 61 as shown.

Referring to FIG. 8, the counter and lift of the present alternative embodiment may be identical or very similar to the above described counter and lift with the following exceptions: The frame 61 is formed of a magnetic material so that a magnet 82 mounted on an arm 83 secured to the counter will retain the frame in position while the lift is pivoting the basket 60. The magnet serves to finally position the grocery cart and additionally to maintain it in position so that downward movement of the lift will cause the basket to move properly into the frame and will cause the trunnion elements 65 to be guided by converging surfaces 85 of the brackets 72 into the openings 70. In the embodiment of FIGS. 5 through 8, the switch 38 above described could be mounted at the magnet 82 so that whenever the frame is in engagement with the magnet, the circuit 36 is energized.

From the above description, it will be obvious that the present invention provides an improved cart and counter arrangement which greatly facilitates transferring of the groceries from the cart to the check-out counter. It will also be appreciated that the present invention provides an improved check-out cart and counter arrangement incorporating a novel power operated mechanism, circuit and control arrangement for facilitating unloading of the contents of the cart upon the counter.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In combination, a counter having a counter top, a cart including a basket having a smoothly curved, upwardly opening scoop shape, a cart lift pivoted to said counter and formed to permit positioning of said cart thereover, power means arranged to raise and pivot said lift and the basket of the cart toward the counter top and to tilt the basket so that the contents thereof move onto the counter top, and an electric eye mounted on said counter and arranged to sense objects moving out of said basket onto said counter top and to stop said power means when objects are so sensed.

2. In combination, a counter having a counter top, a cart lift pivoted to said counter and curving downwardly and outwardly for receiving a cart thereover, power means for progressively cradling said cart on said lift and pivoting said lift adjacent said counter top for sliding the contents of the said cart toward said counter top, and an automatic control for said power means including an electric circuit incorporating a switch adapted to be activated by a cart adjacent said counter.

3. In combination, a counter having a countertop, a cart having an open upper end defined by a peripheral edge including a portion lying substantially in the plane of said countertop in abutting relationship thereto, lift means adapted to engage said cart and rotate it about a horizontal axis extending through said portion of said edge, and a smooth curved substantially concave lower surface in said cart upon which the contents of said cart are normally disposed, said surface extending to a point adjacent said upper open end of said cart and being normally disposed below said axis with said contents resting on the lowermost portion thereof, the curvature and friction coefficient of said surface permitting said contents to slide along the interior towards said open end and said countertop without tumbling as said cart is rotated and said concave surface is raised above said axis.

4. In combination, a counter having a countertop, a cart having an open upper end defined by a peripheral rim including a rim portion lying substantially in the plane of said countertop in abutting relationship thereto, lift means adapted to engage said cart and rotate said cart about a horizontal axis passing through said rim portion, and a smooth curved substantially concave lower surface in said cart upon which the contents of said cart normally rest, said surface extending to said rim and being normally disposed below said axis with said contents resting on the lowermost portion thereof, the curvature and friction coefficient of said surface permitting said contents to slide along the interior towards said countertop without disturbing their orientation with respect to said horizontal axis as said cart is rotated and said surface is raised above said axis.

5. In combination, a counter having a countertop, a cart including a basket having an open upper end defined by a peripheral edge including a portion lying substantially in the plane of said countertop in abutting relationship thereto, lift means adapted to engage said cart and pivot said cart from a horizontal position to a raised position about an axis extending through said portion of said edge wherein the interior of said basket is disposed above the level of said countertop, and a smooth continuous curved substantially concave surface in said basket upon which the contents of said basket are adapted to normally rest, said concave surface being normally disposed below said countertop with said contents resting on the lowermost portion of said surface, the curvature and friction coefficient of said surface permitting said contents to slide along said surface towards said countertop as said cart is moved to said raised position, said contents resting at any moment at the lowermost portion of said concave surface without departing from their original orientation with respect to said axis.

6. In combination, a counter having a counter top, a cart lift pivoted to said counter and curving downwardly and outwardly for receiving a cart thereover, and power means for progressively cradling said cart on said lift and pivoting said lift adjacent said counter top for sliding the contents of the said cart toward said counter top, said power means comprising an air piston arrangement connected to said lift and counter, a compressed air supply, and a valve for controlling flow of compressed air to said piston arrangement, an automatic control for said power means including an electrical circuit incorporating a switch adapted to be activated by a cart adjacent said counter, said electrical circuit adapted to actuate said valve to admit compressed air to said piston arrangement for raising said lift, said electrical circuit also including an electric eye positioned to sense objects moving out of said cart onto said counter top and to stop said power means when objects are so sensed.

References Cited by the Examiner

UNITED STATES PATENTS

| 1,104,055 | 7/14 | Lowe | 298—2 X |
| 2,121,224 | 6/38 | Garlinghouse | 298—2 |
| 2,129,394 | 9/38 | Allen | 214—314 |
| 2,268,220 | 12/41 | Marshall | 214—314 |
| 2,577,091 | 12/51 | Porter | 214—307 |
| 2,702,138 | 2/55 | Getty | 214—307 |
| 2,727,750 | 12/55 | Moll | 280—33.99 |
| 2,797,003 | 6/57 | Altenpohl | 214—308 |
| 2,943,707 | 7/60 | Ramlose | 186—1.1 |

FOREIGN PATENTS 858,639    1/61   Great Britain.

SAMUEL F. COLEMAN, *Primary Examiner.*

KARL J. ALBRECHT, ERNEST A. FALLER,
*Examiners.*